No. 795,018.	Patented July 18, 1905.

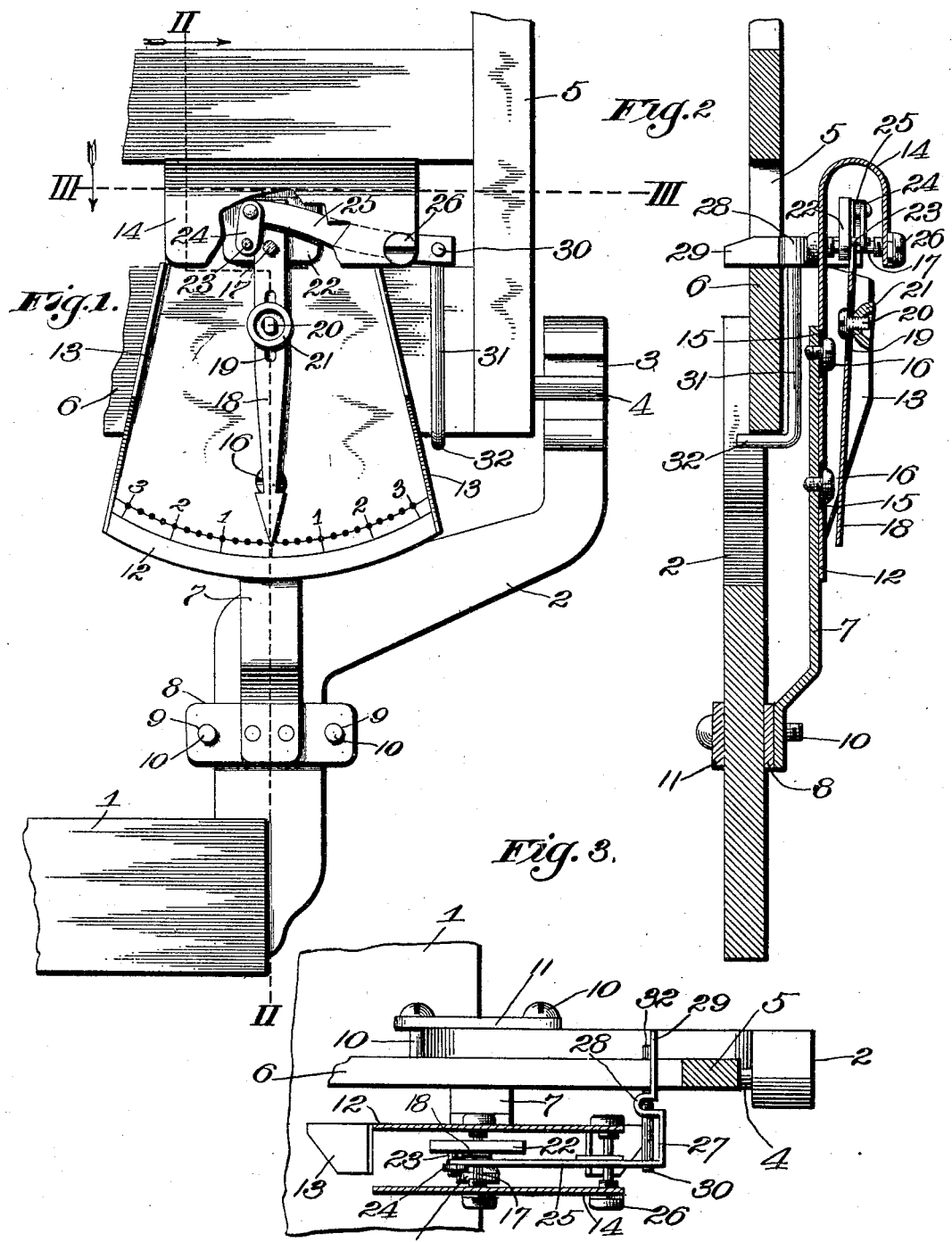

UNITED STATES PATENT OFFICE.

JOHN BARRY AND MICHEAL L. SHAUGHNESSY, OF WESTPHALIA, KANSAS, ASSIGNORS OF ONE-HALF TO L. J. BARRETT AND C. M. ELMORE, OF HOISINGTON, KANSAS.

OVERWEIGHT OR UNDERWEIGHT INDICATOR AND COMPUTER.

SPECIFICATION forming part of Letters Patent No. 795,018, dated July 18, 1905.

Application filed August 30, 1904. Serial No. 222,752.

*To all whom it may concern:*

Be it known that we, JOHN BARRY and MICHEAL L. SHAUGHNESSY, citizens of the United States, residing at Westphalia, in the county of Anderson and State of Kansas, have invented certain new and useful Improvements in Overweight or Underweight Indicators and Computers for Weighing-Scales, of which the following is a specification.

Our invention relates to weighing-scales, and more especially to that class which compute the money value of the article weighed and which are equipped with attachments to indicate how much in money value the article being weighed exceeds or falls below the proper amount; and our object is to produce attachments of this character which operate automatically and reliably, are of simple and inexpensive construction, and can be applied easily and quickly to computing-scales in general use.

With this object in view the invention consists in certain novel and peculiar features of construction and organization, as hereinafter described and claimed, and in order that it may be fully understood reference is to be had to the accompanying drawings, in which—

Figure 1 is a rear face view of the right-hand end of a grocer's computing-scale equipped with an over and under weight attachment embodying our invention, the attachment being broken away to more clearly disclose the construction. Fig. 2 is a vertical section taken on the line II II of Fig. 1. Fig. 3 is a horizontal section taken on the line III III of Fig. 1.

In the said drawings, 1 designates the usual traveling frame forming a part of an ordinary grocer's computing-scale, and 2 an angular arm secured to or cast therewith and provided with a vertical recess or slot 3, into which projects a pin 4, projecting from the end bar 5, rigidly secured to and connecting the usual scale-beams, only two of said beams appearing and but one numbered, as at 6. Said beams and bar 5 constitute what is hereinafter termed the "scale-beam frame," the same being balanced in the customary manner. (Not shown.)

With this class of scale the outward adjustment of the poise (not shown) of course depresses the end of the beam until pin 4 strikes the bottom of recess or slot 3, the beam moving upward as the commodity placed on the scale closely approaches the weight necessary to counterbalance the poise. When the weight of the poise is counterbalanced, the pin occupies the position shown in Fig. 1, and when the weight overbalances the poise the pin of course rises above the position indicated. To insure that the customer shall receive full value for the money paid and at the same time expedite the weighing operation, so that the salesman shall not lose any unnecessary time, we have provided an attachment which begins to operate just before full weight is placed upon the scale in order to show the money value of the difference between the weight of the commodity at that time on the scale and the weight which should be there to counterbalance the beam, and thus enable the salesman to more accurately gage the additional quantity which must be placed upon the scale to balance the beam. By thus warning the salesman that the quantity which is first placed on the scale lacks only a few cents' worth of the quantity which should be placed thereon the weighing operation is facilitated. Furthermore, by indicating the money value of the excess or deficiency of the commodity being weighed over or under the proper weight, respectively, the necessity for accurate weighing is determined, as accurate weighing of cheap commodities is not as essential as accurate weighing of expensive commodities, especially during the rush hours of the day.

Referring to the drawings, 7 designates a standard rising from a clamp, consisting of plate 8, provided with a pair of threaded holes 9, screw-bolts 10, engaging said holes, and plate 11, through which said bolts extend, the plates 8 and 11 being clamped tightly upon standard 2, so that standard 7 shall be disposed parallel with and rearward of beam 6. A dial-frame 12, of sheet metal, is provided with downwardly-diverging side walls 13 and a return-bend or gooseneck top portion 14, and said frame is arranged vertically against the rear side of standard 7 and is provided with vertical slots 15, through which screw-bolts 16, carried by the standard, extend for the purpose of clamping said frame at the desired point of adjustment, said frame being made adjustable on the standard in order to accommodate scales of varying proportions.

17 designates an arbor mounted in the top portion of the frame and forming a pivot for the index-finger 18. Said finger when the scale is balanced depends vertically and registers with "0," the central mark of the dial marks or indicia of the plate, said marks being disposed concentrically of pivot 17 and being marked both ways from "0" upward. When the commodity being weighed is worth sixteen cents or more per pound, the division-marks represent cent values; but when the commodity is valued at fifteen cents or less per pound said marks represent quarter-cent values, it being understood, of course, that the marking of the dial corresponds to that (not shown) of the scale proper, in which one of the beams above beam 6 shows values of fifteen cents or less and the other beam (not shown) values of sixteen cents or more per pound.

The index-finger is provided with a longitudinal slot 19, through which extends screw-bolt 20, engaged by a clamping-nut 21. By back rotation of said nut the screw can be adjusted along the length of said slot and resecured at the point desired by the opposite manipulation of the nut. This adjustment of the screw and nut up or down respectively increases or diminishes the leverage of the scale-beam on said finger, and the particular advantage derived from said adjustable weight is to insure the proper action of the finger irrespective of the fact that lost motion may exist through wear of some of the connections between said finger and the beam 6.

22 designates a plate secured on the upper end of the finger; and 23 a pivot-pin carried thereby inward or to the left of the finger, said pin being pivotally connected by link 24 with the inner end of a lever 25, mounted on pivot 26, carried by the dial-framework. Outward, or to the right of the latter, said lever is provided with a double-U bend 27 and 28 and from the latter has an arm 29, which overhangs and is barely out of contact with beam 6, a substantially Z-shaped bracket consisting of an arm 30, pivoted in return-bend 27 of the lever, a vertical arm 31 at the rear side of beam 6, and a horizontal arm 32, closely underlying beam 6, the arrangement being such that downward movement of the beam gives corresponding movement of the pivoted bracket and through the connections described swings the index-finger 18 to the left, while upward movement of the beam through the medium of lever-arm 29 moves said index-finger to the right.

In the practical operation of weighing a commodity the poise of the scale is first "set," and as a result the outer end of beam 6 is depressed until pin 4 strikes the bottom of recess or slot 3, the index-finger 18 at the same time moving to the left until it is at that end of the dial-indicia. As the weight of the commodity approaches that indicated by the position of the poise the upward movement of the beam begins and is attended instantly by movement of the index-finger to the right, said finger in its progress showing exactly the money value of the amount or quantity of the commodity which is lacking to make up the required weight. The movement of this index-finger instantly places the salesman on guard so that he may avoid placing more than the required quantity on the scale, and thus if the commodity happens to be an expensive one be under the necessity of removing the excess. If an excess was placed on the scale, the overweight in money value would be noted at a glance by reference to the indicia of the dial-plate to the right of the "0" mark. In the busy hours of the day it would be cheaper to give a slight excess in weight of the cheaper commodities than attempt to bring the scale to an exact balance, as sufficient time in the aggregate would be saved to wait on a large number of additional customers.

From the above description it will be apparent that we have produced an overweight and underweight indicator and computer for weighing-scales which operates efficiently and which is obviously susceptible of modification in a number of particulars without departing from the principle of construction and operation involved.

Having thus described the invention, what we claim as new, and desire to secure by Letters Patent, is—

1. An overweight and underweight computer attachment for weighing-scales, comprising a dial-frame containing indicia, an index-finger pivoted to said dial-frame to play back and forth across said indicia, a lever pivoted to the dial-frame and linked to the index-finger, a bracket attached to the outer or free end of the lever, and a clamping device attached to the dial-frame and adapted to detachably engage a weighing-scale and serve as a support for the attachment.

2. An overweight and underweight computer attachment for weighing-scales, comprising a dial-frame containing indicia, an index-finger pivoted to said dial-frame to play back and forth across said indicia, a lever pivoted to the dial-frame and linked to the index-finger, a bracket pivoted to the free or outer end of the lever, and a clamping device attached to the dial-frame and adapted to detachably engage a weighing-scale and serve as a support for the attachment.

3. An overweight and underweight computer attachment for weighing-scales, comprising a dial-frame containing indicia, an index-finger pivoted to said dial-frame to play back and forth across said indicia, a lever pivoted to the dial-frame and linked to the index-finger and provided with a horizontal arm at its free or outer end, a bracket pivotally supported from said end of the lever and provided with an arm paralleling the arm of the lever, and a clamping device attached to the dial-frame and adapted to detachably engage a weighing-scale and serve as a support for the attachment.

4. The combination with a weighing-scale, of an overweight and underweight indicator and computer, comprising a dial-frame, containing indicia marked from "0" upward in opposite directions, an index-finger to play across said indicia, a lever mounted on the dial-frame, and provided with an arm overlying the scale-beam, a bracket pivotally suspended from said lever and underlying said beam, and a link connection between said lever and the index-finger.

5. The combination with a weighing-scale, of an overweight and underweight indicator and computer, comprising a dial-frame, containing indicia marked from "0" upward in opposite directions, an index-finger to play across said indicia and pivoted in the dial-frame, a plate secured to said finger, a lever pivoted on said frame and linked to said plate and provided with an arm overlying the scale-beam and a bracket underlying said beam, and an adjustable weight carried by the finger.

6. The combination with a weighing-scale, of an overweight and underweight indicator and computer, comprising a standard clamped on the scale, a dial-frame carried by the standard and containing indicia marked from "0" upward in opposite directions, an index-finger to play across said indicia and pivoted in the dial-frame, a plate secured to said finger, a lever pivoted on said frame and linked to said plate and provided with an arm overlying the scale-beam and a bracket underlying said beam, and an adjustable weight carried by the finger.

In testimony whereof we affix our signatures in the presence of two witnesses.

JOHN BARRY.
MICHEAL L. SHAUGHNESSY.

Witnesses:
ELIAS MADAR,
PETE HINTZ.